United States Patent
Hino et al.

(10) Patent No.: US 9,347,652 B2
(45) Date of Patent: May 24, 2016

(54) LIGHTING DEVICE AND LIGHTING DEVICE SET

(71) Applicant: Toshiba Lighting & Technology Corporation, Yokosuka-shi, Kanagawa-ken (JP)

(72) Inventors: Kiyokazu Hino, Yokosuka (JP); Toshihiro Hatanaka, Yokosuka (JP)

(73) Assignee: Toshiba Lighting & Technology Corporation, Yokosuka-shi, Kanagawa-ken (JP)

( * ) Notice: Subject to any disclaimer, the term of this patent is extended or adjusted under 35 U.S.C. 154(b) by 12 days.

(21) Appl. No.: 14/340,593

(22) Filed: Jul. 25, 2014

(65) Prior Publication Data

US 2015/0176814 A1   Jun. 25, 2015

(30) Foreign Application Priority Data

Dec. 20, 2013   (JP) ................................ 2013-264284

(51) Int. Cl.
| | |
|---|---|
| F21V 15/00 | (2015.01) |
| F21S 8/10 | (2006.01) |
| F21V 5/04 | (2006.01) |
| F21V 7/04 | (2006.01) |
| F21V 17/00 | (2006.01) |
| F21V 19/00 | (2006.01) |
| F21V 8/00 | (2006.01) |

(Continued)

(52) U.S. Cl.
CPC ............... *F21V 15/00* (2013.01); *F21S 48/215* (2013.01); *F21V 5/04* (2013.01); *F21V 7/04* (2013.01); *F21V 17/002* (2013.01); *F21V 19/003* (2013.01); *F21V 23/06* (2013.01); *G02B 6/0006* (2013.01); *F21Y 2101/02* (2013.01)

(58) Field of Classification Search
CPC ........... F21V 15/00; F21V 23/06; F21V 5/04; F21V 17/002; F21V 19/003; F21V 7/04; F21S 48/215; G02B 6/0006
See application file for complete search history.

(56) References Cited

U.S. PATENT DOCUMENTS

| | | | |
|---|---|---|---|
| 7,588,359 B2 | 9/2009 | Coushaine et al. | |
| 2003/0063474 A1* | 4/2003 | Coushaine | ............... F21K 9/00 362/517 |

(Continued)

FOREIGN PATENT DOCUMENTS

| | | |
|---|---|---|
| DE | 102010003364 A1 | 11/2011 |
| DE | 102011051050 A1 | 12/2012 |

(Continued)

OTHER PUBLICATIONS

Jun. 16, 2015—(EP) Extended Search Report—App 14177101.4.

*Primary Examiner* — Laura Tso
(74) *Attorney, Agent, or Firm* — Banner & Witcoff, Ltd.

(57) ABSTRACT

A lighting device includes a body section; a cover section provided on an end surface of the body section; and a light emitting module provided between the body section and the cover section, having a light emitting element. A position of the end section of the light emitting module is equal to a position of the end section of the body section, or is nearer to the side of the cover section than the position of the end section of the body section. The position of the end section on the side of the body section in a portion in which the cover section comes into contact with the body section is nearer to the side of the body section than the position of the end section of the light emitting module on the side of the cover section.

15 Claims, 2 Drawing Sheets

(51) Int. Cl.
*F21V 23/06* (2006.01)
*F21Y 101/02* (2006.01)

(56) References Cited

U.S. PATENT DOCUMENTS

| 2007/0047232 A1 | 3/2007 | Kim et al. |
| 2007/0070645 A1 | 3/2007 | Coushaine et al. |
| 2010/0020561 A1 | 1/2010 | An |
| 2010/0302777 A1* | 12/2010 | Knoll ................... F21V 17/06 362/235 |
| 2013/0042510 A1* | 2/2013 | Nall ........................ F21V 5/04 40/541 |
| 2013/0051005 A1 | 2/2013 | Markell et al. |
| 2014/0268854 A1 | 9/2014 | Wilkinson et al. |
| 2015/0055364 A1 | 2/2015 | Kosugi et al. |

FOREIGN PATENT DOCUMENTS

| EP | 1767967 A2 | 3/2007 |
| EP | 2840296 A2 | 2/2015 |
| JP | 2008-166145 A | 7/2008 |
| JP | 2012-038698 A | 2/2012 |

\* cited by examiner

LIGHTING DEVICE AND LIGHTING DEVICE SET

CROSS-REFERENCE TO RELATED APPLICATIONS

This application is based upon and claims the benefit of priority from Japanese Patent Application No. 2013-264284, filed on Dec. 20, 2013; the entire contents of which are incorporated herein by reference.

FIELD

Embodiments described herein relate generally to a lighting device and a lighting device set.

BACKGROUND

There is a lighting device including a light emitting module that has a Light Emitting Diode (LED), and a body section on which the light emitting module is mounted.

In such a lighting device, the body section of the lighting device is directly mounted on a lamp fitting that is provided in a vehicle and the like, and includes a lens, and the like.

Here, if the body section of the lighting device is common across various lamp fittings, it is possible to improve productivity or to achieve cost reduction.

However, since a configuration of an optical element such as a lens is changed depending on usage, design, and the like of the lamp fitting, a plurality of optical elements having different configurations are required.

Thus, if the body section of the lighting device is made overly common, there is a concern that the optical element having an inappropriate configuration may be mounted on a predetermined lamp fitting (misassembly).

Thus, development of the lighting device that can achieve a common body section of the lighting device and suppress the occurrence of misassembly is desired.

DETAILED DESCRIPTION

Figure 1:
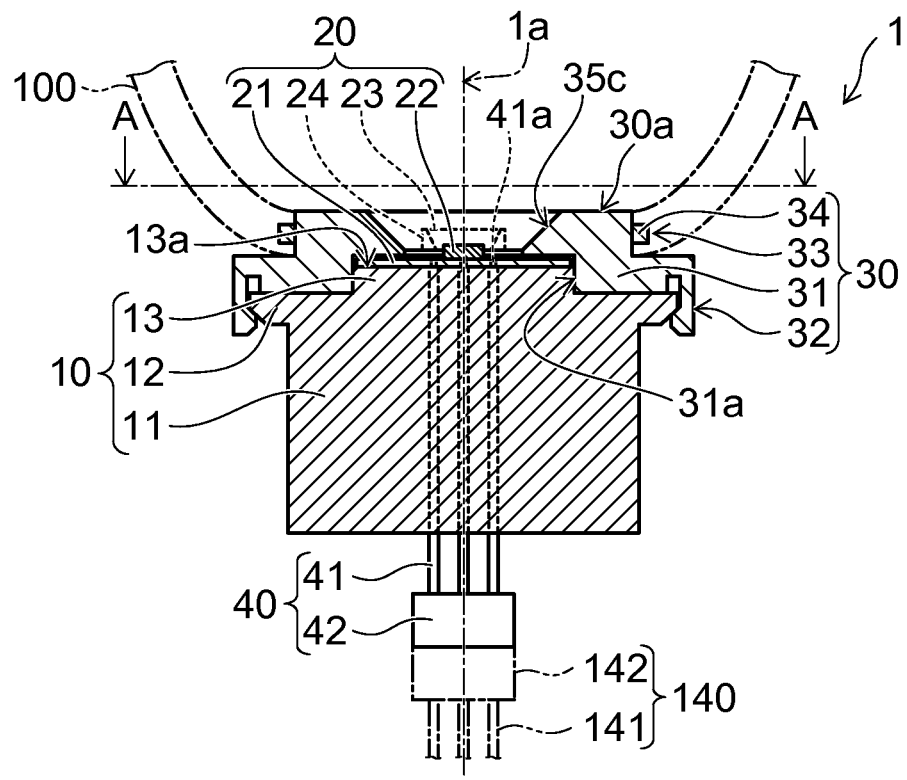
FIG. 1 is a schematic cross-sectional view illustrating a lighting device according to an embodiment.

According to an embodiment, a lighting device includes: a body section; a cover section provided on an end surface of the body section; and a light emitting module provided between the body section and the cover section, having a light emitting element.

Then, the cover section has a mount section by which the cover section is mounted on a lamp fitting.

A position of the end section of the light emitting module on the side of the cover section is equal to a position of the end section of the body section on the side of the cover section, or is nearer to the side of the cover section than the end section of the body section.

The position of the end section on the side of the body section in a portion in which the cover section comes into contact with the body section is nearer to the side of the body section than the position of the end section of the light emitting module on the side of the cover section.

According to the lighting device, it is possible to selectively mount one of the cover sections having different configurations from each other on the body section that is common. Thus, it is possible to have the common body section of the lighting device and to suppress the occurrence of misassembly.

The cover section may include a first base section that is provided in the end surface of the body section; an optical element section that protrudes from the end surface of the first base section on the opposite side of the base section in a direction of a center axis of the lighting device; the mount section that protrudes from a side surface of the optical element section in a direction orthogonal to the center axis of the lighting device; and an optical element that is provided in the optical element section and performs optical control to light emitted from the light emitting element.

According to the cover section having such a configuration, it is possible to correspond to various optical specifications with respect to the lighting device.

Furthermore, the optical element may have at least one function of a reflector, a lens, and a light guide body.

According to the optical element having such a configuration, it is possible to correspond to various optical specifications with respect to the lighting device.

Furthermore, the lighting device may further include wiring of which one end is electrically connected to the light emitting module; and a connector that is electrically connected to the other end of the wiring.

According to the aspect, since the connectors that are different from each other may be used for each of types of the lamp fitting, it is possible to suppress occurrence of the misassembly.

Furthermore, according to another embodiment, a lighting device set includes: a body section; a first cover section that is provided on an end surface of the body section; a second cover section that is provided on the end surface of the body section; and a light emitting module that is provided between the body section and the first cover section, or between the body section and the second cover section, and has a light emitting element.

Then, the first cover section has a first mount section by which the first cover section is mounted on a first lamp fitting, and a first optical element that performs optical control to light emitted from the light emitting element.

The second cover section has a second mount section by which the second cover section is mounted on a second lamp fitting, and a second optical element that performs optical control to the light emitted from the light emitting element.

According to the lighting device set, it is possible to appropriately select the cover section having a desired optical function. Thus, according to the lighting device set, it is possible to achieve the common body section and to rapidly correspond to various optical specifications with respect to the lighting device.

Hereinafter, an embodiment will be described with reference to the drawings. Moreover, in the drawings, the same reference numerals are given to the same configuration elements and detailed description thereof is appropriately omitted.

Moreover, for example, the lighting device and the lighting device set according to embodiments may be a lighting device and a lighting device set which are used in a moving body such as an automobile, a railroad vehicle, a plane, and a ship.

For example, the lighting device and the lighting device set may be used in a rear fog lamp, a position lamp (side lamp), a number lamp, a back lamp, a stop lamp, a tail lamp (rear lamp), a blinker (directional indicator), an indoor lamp, indication, a signal, or the like of the automobile. However, usage of the lighting device and the lighting device set is not limited to the examples.

Lighting Device 1

First, a lighting device 1 according to an embodiment will be illustrated.

FIG. 1 is a schematic cross-sectional view illustrating the lighting device 1 according to the embodiment.

Figure 2:
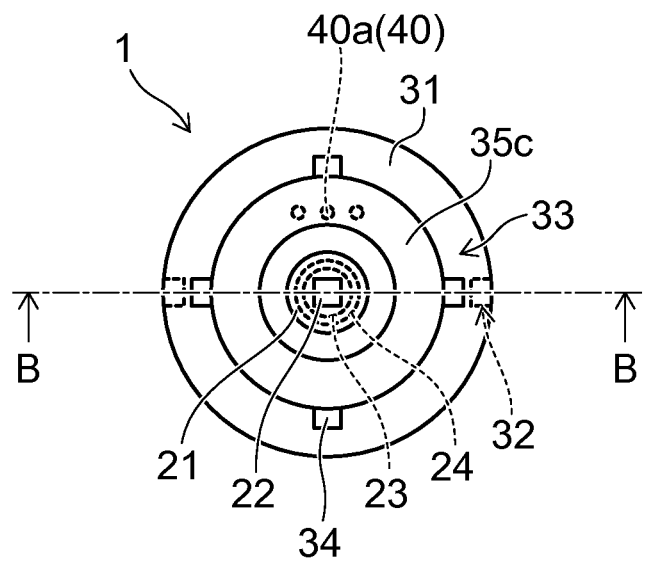
FIG. 2 is a view taken along arrow line A-A in FIG. 1.

Moreover, FIG. 1 is a cross-sectional view taken along line B-B in FIG. 2.

FIG. 2 is a view taken along arrow line A-A in FIG. 1.

As illustrated in FIGS. 1 and 2, the lighting device 1 is provided with a body section 10, a light emitting module 20, a cover section 30, and a wiring section 40.

The body section 10 is provided with a base section 11 (corresponding to an example of a second base section), a flange section 12, and a positioning section 13.

The base section 11 protrudes from one end surface of the flange section 12 in a direction of a center axis 1a of the lighting device 1. One end section side of wiring 41 is inserted into the base section 11.

Furthermore, the base section 11 may be provided with a plurality of heat radiation fans (not illustrated).

The flange section 12 presents a plate shape.

The flange section 12 protrudes from the side surface of one end section of the base section 11 in a direction orthogonal to the center axis 1a of the lighting device 1.

The positioning section 13 protrudes from an end surface on the opposite side of a side of the flange section 12 on which the base section 11 is provided in the direction of the center axis 1a of the lighting device 1.

A concave section 31a provided in a base section 31 (corresponding to an example of a first base section) of the cover section 30 is fitted into the positioning section 13.

Thus, it is possible to position the light emitting module 20 provided in the body section 10 and an optical element described below and provided in the cover section 30.

The light emitting module 20, the cover section 30, and the like are mounted on the body section 10. The body section 10 has a function for radiating heat generated in the light emitting module 20 and the like to the outside of the lighting device 1.

Thus, the body section 10 may be formed of a material having a high thermal conductivity considering that the heat is radiated to the outside. For example, the body section 10 may be formed of aluminum, aluminum alloy, a high thermal conductive resin, and the like. For example, the high thermal conductive resin is a material which is prepared by mixing fibers or particles consisting of carbon or aluminum oxide having a high thermal conductivity into a resin such as Polyethylene terephthalate (PET) or nylon.

In this case, the portion in which the heat radiation fans (not illustrated) and the like radiate the heat to the outside is formed of a material having a high thermal conductivity and the other portions may be formed of a resin or the like.

Here, in the lighting device 1 according to the embodiment, the body section 10 is common across various lamp fittings 100 provided in a vehicle or the like.

That is, configurations of the body section 10 become the same as each other even if configurations of a mounting member of the lamp fitting 100 are different from each other.

However, the configurations of the body section 10 are not limited to the example illustrated in FIGS. 1 and 2, and may be made common with each other.

The light emitting module 20 is provided between the body section 10 and the cover section 30.

The light emitting module 20 is provided with a substrate 21, a light emitting element 22, and a sealing section 23.

The substrate 21 is provided on an end surface on the opposite side of the positioning section 13 with respect to the flange section 12.

The substrate 21 presents a plate shape and is provided with a wiring pattern (not illustrated) on the surface thereof.

A material or a structure of the substrate 21 is not specifically limited. For example, the substrate 21 may be formed of an inorganic material (ceramic) such as aluminum oxide or aluminum nitride, an organic material such as paper phenol or glass epoxy, and the like. Furthermore, the substrate 21 may be a substrate which is coated with an insulator on a surface of a metal plate. Moreover, in the case of coating with the insulator on the surface of the metal plate, the insulator may be formed of an organic material, or may be formed of an inorganic material.

If a heat value of the light emitting element 22 is large, the substrate 21 is preferably formed by using a material having a high thermal conductivity in view of the heat radiation. As the material having the high thermal conductivity, for example, it is possible to illustrate a material which is coated with an insulator on the surface of ceramics such as aluminum oxide or aluminum nitride, a high thermal conductive resin, and the metal plate.

Furthermore, the substrate 21 may be a single layer and may be multiple layers.

The substrate 21 is provided with a hole passing through in a thickness direction. Then, an input terminal of a wiring pattern (not illustrated) is provided in a periphery of the hole passing through the substrate 21 in the thickness direction. A connection end 41a of the wiring section 40 inserted into the hole passing through the substrate 21 in the thickness direction is soldered to the input terminal of the wiring pattern (not illustrated). Thus, the light emitting element 22 is electrically connected to a power supply or the like provided in the outside through the wiring pattern (not illustrated), a soldering portion, the wiring section 40, and an outside wiring section 140.

The light emitting element 22 is mounted on the wiring pattern (not illustrated) provided on the surface of the substrate 21.

The light emitting element 22 may have an electrode (not illustrated) on a surface (upper surface) of opposite side of a side in which the wiring pattern (not illustrated) is provided. Moreover, the electrode (not illustrated) may be provided on a surface (lower surface) of a side in which the wiring pattern (not illustrated) is provided and on the surface (upper surface) of opposite side of the side in which the wiring pattern (not illustrated) is provided, and may be provided on only one surface thereof.

The electrode (not illustrated) provided on the lower surface of the light emitting element 22 is electrically connected to a mounting pad provided in the wiring pattern (not illustrated) through a conductive heat curing material such as silver paste. The electrode (not illustrated) provided on the upper surface of the light emitting element 22 is electrically connected to the wiring pad provided in the wiring pattern (not illustrated) through wiring (not illustrated). For example, bonding of the wiring (not illustrated) may be performed using a wire bonding method.

For example, the light emitting element 22 may be a light emitting diode, an organic light emitting diode, a laser diode, and the like.

The upper surface of the light emitting element 22 that is a light emitting surface faces a front side of the lighting device 1 and mainly emits the light toward the front side of the lighting device 1.

The number, the size, the arrangement, and the like of the light emitting element 22 are not limited to the example, and may be appropriately changed depending on the size, usage, or the like of the lighting device 1.

Furthermore, it is possible to mount a control element (not illustrated) that controls a current flowing in the light emitting element 22 on the wiring pattern (not illustrated).

Furthermore, it is possible to mount a circuit part (not illustrated) and the like on the wiring pattern (not illustrated), if necessary.

The sealing section 23 covers the wiring for connecting among the light emitting element 22, an electrode (not illustrated) of the light emitting element 22, and the wiring pad of the wiring pattern (not illustrated).

The sealing section 23 may be formed of a material having translucency. For example, the sealing section 23 may be formed of a silicone resin, an epoxy resin, or the like.

Furthermore, the sealing section 23 may include a phosphor. For example, the phosphor may be an yttrium.aluminum.garnet phosphor (YAG phosphor).

For example, if the light emitting element 22 is a blue light emitting diode and the phosphor is the YAG phosphor, the YAG phosphor is excited by the blue light emitted from the light emitting element 22 and yellow phosphor is emitted from the YAG phosphor. Then, white light is emitted from the lighting device 1 by mixing the blue light and the yellow light. Moreover, types of the phosphor or types of the light emitting element 22 are not limited to the example and may be appropriately changed so as to obtain a desired color of the emitted light depending on usage or the like of the lighting device 1.

Furthermore, a required member may be further provided on the substrate 21 depending on the usage of the lighting device 1, a function, or the like of the optical element provided in an optical element section 33 described below.

For example, the optical element section 33 illustrated in FIGS. 1 and 2 is provided with a concave section 35c that is an optical element having a function of a reflector. However, as described below, the optical element section 33 may be provided with optical elements (for example, a light distribution section 35a, a lens section 35b, a light guide section 35d, and the like) having other optical functions such as a lens, a light guide body, and the like.

For example, if optical elements other than the optical element having the function of the reflector are provided, a surrounding wall member 24 may be further provided on the substrate 21.

The surrounding wall member 24 is provided on the substrate 21 so as to surround the light emitting element 22. For example, the surrounding wall member 24 presents a circular shape and the light emitting element 22 is exposed in a center section thereof.

For example, the surrounding wall member 24 may be formed of a resin such as polybutylene terephthalate (PBT) or polycarbonate (PC), ceramics, and the like.

Furthermore, if the material of the surrounding wall member 24 is the resin, it is possible to improve a reflectivity to the light emitted from the light emitting element 22 by mixing particles such as titanium oxide.

Moreover, the example is not limited to particles of the titanium oxide and particles formed of a material having a high reflectivity to the light emitted from the light emitting element 22 may be mixed.

Furthermore, for example, the surrounding wall member 24 may be formed of a white resin.

A side wall surface of the surrounding wall member 24 on the center section side is an inclined surface. Some of the light emitted from the light emitting element 22 is reflected on the side wall surface of the surrounding wall member 24 and is emitted toward a front surface side of the lighting device 1.

Furthermore, the light that is some of the light emitted from the light emitting element 22 toward the front surface side of the lighting device 1 and is totally reflected on a ceiling surface (an interface between the sealing section 23 and outside air) of the sealing section 23 is reflected on the side wall surface of the surrounding wall member 24 on the center section side, and then is again emitted toward the front surface side of the lighting device 1.

That is, the surrounding wall member 24 has the function of the reflector. Moreover, the form of the surrounding wall member 24 is not limited to the example and may be appropriately changed depending on the usage and the like of the lighting device 1.

Moreover, if the surrounding wall member 24 is provided, the sealing section 23 described above may be provided in the center section of the surrounding wall member 24. In this case, the form of the sealing section 23 is defined by the form of the surrounding wall member 24.

Meanwhile, if the surrounding wall member 24 is not provided, the form of the sealing section 23 may be a dome shape or the like.

Here, a distance between the light emitting element 22 of the light emitting module 20 and the optical element section 33 of the cover section 30 described below is preferably short.

If the distance between the light emitting element 22 of the light emitting module 20 and the optical element section 33 of the cover section 30 is long, an amount of the light of the light emitted from the light emitting element 22, which is not incident on the optical element provided in the optical element section 33 is increased.

Thus, in the lighting device 1 according to the embodiment, a position (a position of a portion of the light emitting module 20, which is the nearest to an end surface 30a of the cover section 30 on the opposite side of the body section 10) of the end section of the light emitting module 20 on the side of the cover section 30 is equal to the position of the end section of the body section 10 on the side of the cover section 30 or is nearer to the side of the cover section 30 than the end section of the body section 10.

That is, an upper end of the body section 10 does not protrude to the side of the cover section 30 more than an upper end of the light emitting module 20.

For example, in a case illustrated in FIG. 1, the position of the sealing section 23 of the light emitting module 20 or the upper end of the surrounding wall member 24 is located above the position of an upper surface 13a of the positioning section 13 of the body section 10.

Thus, the distance between the light emitting element 22 of the light emitting module 20 and the optical element section 33 of the cover section 30 may be short so that it is possible to improve utilization efficiency of the light emitted from the light emitting element 22.

The cover section 30 is provided on one end surface of the body section 10.

The cover section 30 is provided with the base section 31, a holding claw 32, the optical element section 33, and a mount section 34.

The cover section 30 is provided to protect the light emitting module 20 and to perform optical control using the optical element provided in the optical element section 33.

The base section 31 presents a plate shape and is provided on the opposite side of the side of the flange section 12 on which the base section 11 is provided.

The concave section 31a is provided on the side of the base section 31 to the flange section 12 (the side of the body section 10).

The holding claw 32 is provided near a peripheral edge of the base section 31.

The holding claw 32 comes into contact with the flange section 12 and the base section 31 of the cover section 30 is pressed against the flange section 12 of the body section 10 by an elastic force.

Thus, it is possible to suppress looseness between the cover section 30 and the body section 10.

The number of the holding claws 32 is not specifically limited and it is possible to stabilize the mounting of the cover section 30 if the number of the holding claws 32 is two or more.

Furthermore, the arrangement of the holding claws 32 is not specifically limited and it is possible to stabilize the mounting of the cover section 30 if distances between the plurality of holding claws 32 are equal to each other (if equally arranged).

Furthermore, it is also possible to mount the cover section 30 on the body section 10 by inserting a leading end of the holding claw 32 into a concave section provided in the body section 10.

However, as described above, if the base section 31 of the cover section 30 is pressed against the flange section 12 of the body section 10 by the elastic force of the holding claw 32, it is possible to reduce the looseness between the cover section 30 and the body section 10.

Furthermore, the cover section 30 and the body section 10 may be bonded using adhesive or the like. In this case, if the holding claw 32 is provided, it is possible to suppress shift of a relative position between the cover section 30 and the body section 10 until the adhesive is cured.

Furthermore, the position of the end section on the side of the body section 10 (for example, the position of the leading end of the holding claw 32) in the portion in which the cover section 30 comes into contact with the body section 10 is nearer to the side of the body section 10 than the position of the end section of the light emitting module 20 on the side of the cover section 30.

Thus, it is possible to increase a degree of freedom for the design of the cover section 30.

The optical element section 33 is provided on the opposite side of the base section 31 with respect to the body section 10.

The optical element section 33 protrudes from the end surface of the opposite side of the base section 31 with respect to the body section 10 in the direction of the center axis 1a of the lighting device 1.

The optical element section 33 is provided with the cone-shaped concave section 35c in which the light emitting element 22 is exposed inside thereof.

The cone-shaped concave section 35c is an optical element having the function of the reflector.

In this case, the optical element is provided in the optical element section 33 and performs optical control to the light emitted from the light emitting element 22.

However, the optical element provided in the optical element section 33 may be appropriately changed depending on the usage, an optical specification, or the like of the lighting device 1.

Moreover, other optical elements provided in the optical element section 33 will be described in detail.

Here, the cover section 30 is mounted on the body section 10. Thus, it is possible to achieve the common body section 10 and to correspond to various optical specifications with respect to the lighting device 1 by appropriately selecting the cover section 30 having a desired optical function.

The mount section 34 protrudes from the side surface of the optical element section 33 in a direction orthogonal to the center axis 1a of the lighting device 1.

The mount section 34 holds the lighting device 1 to the lamp fitting 100 by cooperating with a mounting member on the side of the lamp fitting 100 when mounting the lighting device 1 (the cover section 30) on the lamp fitting 100 provided in the vehicle and the like.

In this case, as a method for holding the lighting device 1 to the lamp fitting 100, an example may be exemplified in which a plurality of mount sections 34 are provided, the mount sections 34 are inserted into grooves and the like on the side of the lamp fitting 100, and then the lighting device 1 is fixed (twist lock) by rotating thereof.

The shape, dimensions, the number, arrangement, and the like of the mount section 34 are not limited to the example and may be appropriately changed depending on the mounting member and the like on the side of the lamp fitting 100.

Here, the cover section 30 having the mount section 34 and the optical element section 33 is mounted on the body section 10. Thus, it is possible to achieve the common body section 10 and to correspond to various mounting forms of the lamp fitting 100 by appropriately selecting the cover section 30 in which the mount section 34 and the optical element section 33 having shapes and dimensions suitable for the mounting member and the like on the side of the lamp fitting 100 are provided.

Furthermore, if the cover section 30 having the mount section 34 and the optical element section 33 which are different from each other for types of the lamp fitting 100 is used, it is possible to suppress occurrence of misassembly.

A material of the cover section 30 is not specifically limited.

In this case, the material of the cover section 30 may be the same as that of the body section 10 and may be different from that of the body section 10.

Furthermore, materials of the base section 31, the holding claw 32, the optical element section 33, and the mount section 34 may be the same as each other, and the materials of the base section 31, the holding claw 32, the optical element section 33, and the mount section 34 may be different from each other.

In this case, the materials of the base section 31, the optical element section 33, and the optical element may be appropriately selected depending on the optical function.

For example, if the base section 31 or the optical element section 33 suppresses leakage of the light to the outside, the material of the base section 31 or the optical element section 33 may be a resin, a metal, or the like having a light shielding property.

Furthermore, if the optical element (the concave section 35c) has the function of the reflector, the material of the optical element may be a material having a high reflectivity to the light emitted from the light emitting element 22.

As the material having a high reflectivity to the light emitted from the light emitting element 22, a resin in which particles such as titanium oxide are mixed, a white resin, or the like may be exemplified.

Moreover, the example is not limited to the resin in which the particles of titanium oxide are mixed and may be a resin in which particles formed of a material having a high reflectivity to the light emitted from the light emitting element 22 are mixed.

Furthermore, if the optical elements (for example, the light distribution section 35a, the lens section 35b, the light guide section 35d, and the like) have the optical function such as the lens, the light guide body, and the like, the material of the optical element may be a translucent material such as a transparent resin.

The wiring section 40 is provided with the wiring 41 and a connector 42.

For example, the wiring 41 may be wiring in which an insulator having a high wear resistance is coated on a wire formed of a conductive material such as copper or a copper alloy.

The wire is exposed in at least one end section of the wiring 41. A portion in which the wire is exposed becomes the connection end 41a.

Furthermore, the wiring section 40 may be a wire harness in which a plurality of wirings 41 are brought together.

Moreover, the number or the dimensions of the wiring 41 is not limited to the example and may be appropriately changed depending on the usage and the like of the lighting device 1.

The connector 42 is electrically connected to the end section on the opposite side of the wiring 41 with respect to the connection end 41a. A connector 142 is detachably connected to the connector 42.

One end section of wiring 141 is electrically connected to the connector 142.

The other end section of the wiring 141 is electrically connected to a power supply or the like of the outside.

It is possible to change forms or models of the connectors 42 and 142 depending on the types of the lamp fitting 100.

If the connectors 42 and 142 which are different from each other for each of the types of the lamp fitting 100 are used, it is possible to suppress the occurrence of misassembly.

In addition, a seal member (not illustrated) formed of a material such as rubber or silicone may be provided between the cover section 30 and the lamp fitting 100.

In the lighting device 1 according to the embodiment, the cover section 30 having a desired optical function may be appropriately selected. Thus, in the lighting device 1, it is possible to achieve the common body section 10 and to correspond to various optical specifications with respect to the lighting device 1.

Furthermore, in the lighting device 1, the cover section 30 in which the mount section 34 and the optical element section 33 having the shapes, the dimensions, or the like suitable for the mounting member and the like on the side of the lamp fitting 100 are provided may be appropriately selected. Thus, in the lighting device 1, it is possible to achieve the common body section 10 and to correspond to various mounting forms of the lighting device 1.

Furthermore, in the lighting device 1, the cover section 30 having the mount section 34 and the optical element section 33 which are different from each other for each of the types of the lamp fitting 100 may be used. Thus, in the lighting device 1, it is possible to suppress the occurrence of misassembly.

Furthermore, in the lighting device 1, the connectors 42 and 142 which are different from each other for each of the types of the lamp fitting 100 may be used. Thus, in the lighting device 1, it is possible to suppress the occurrence of misassembly.

Furthermore, in the lighting device 1, the position of the end section of the light emitting module 20 on the side of the cover section 30 is equal to the position of the end section of the body section 10 on the side of the cover section 30 or is nearer to the side of the cover section 30 than the position of the end section of the body section 10.

Thus, in the lighting device 1, the distance between the light emitting element 22 of the light emitting module 20 and the optical element section 33 of the cover section 30 may be short so that it is possible to improve utilization efficiency of the light emitted from the light emitting element 22.

Furthermore, in the lighting device 1, the position of the end section on the side of the body section 10 in the portion in which the cover section 30 comes into contact with the body section 10 is nearer to the side of the body section 10 than the position of the end section of the light emitting module 20 on the side of the cover section 30.

Thus, it is possible to increase the degree of freedom for the design of the cover section 30.

Lighting Device Set 51

Next, a lighting device set 51 according to the embodiment will be illustrated.

Figure 3:
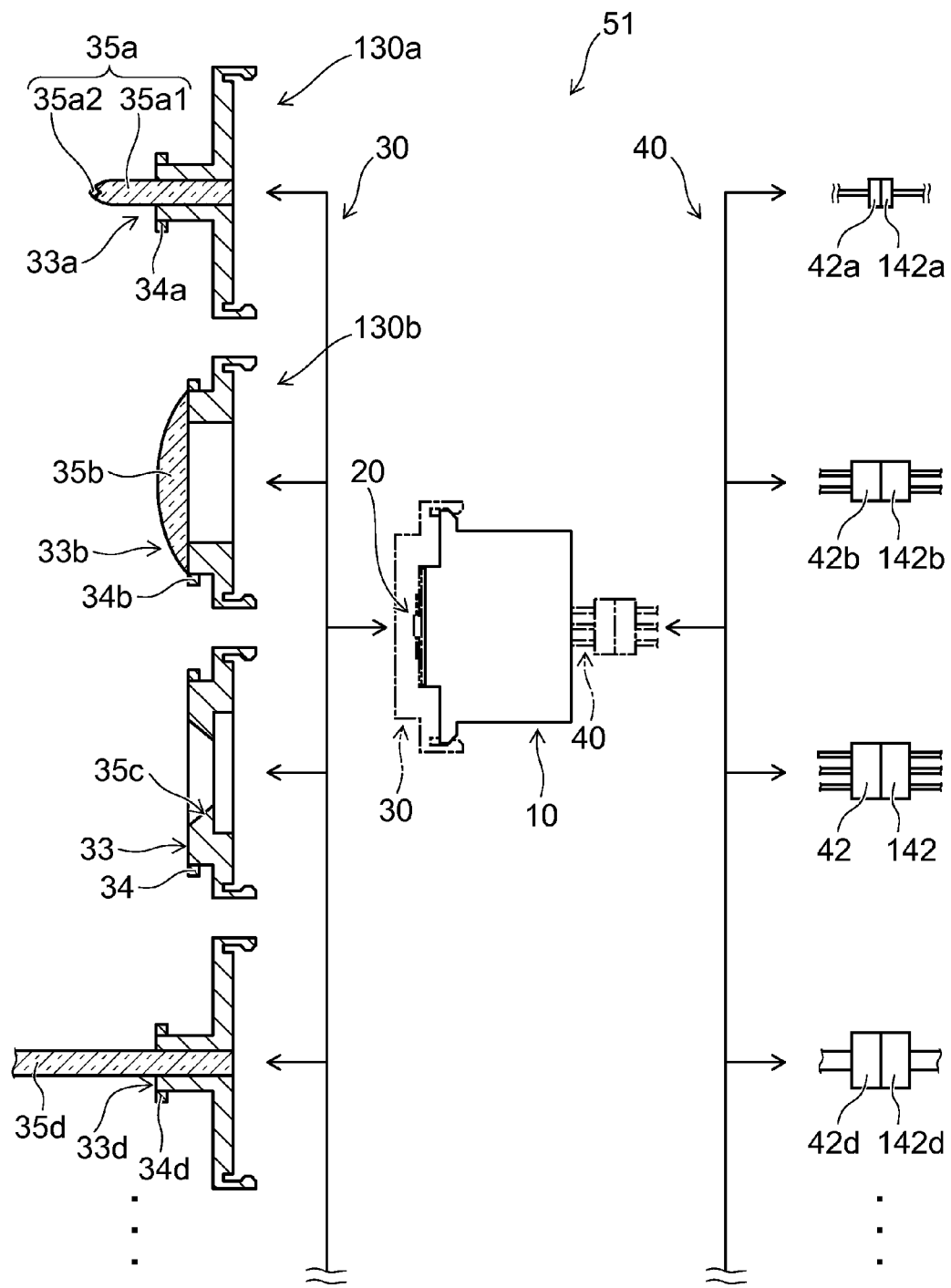
FIG. 3 is a schematic configuration view illustrating a lighting device set according to the embodiment.

FIG. 3 is a schematic configuration view illustrating the lighting device set 51 according to the embodiment.

As illustrated in FIG. 3, the lighting device set 51 includes a plurality of cover sections 30 and wiring sections 40 with respect to the body section 10 that is common.

For example, the cover section 30 may include an optical element section 33a, the light distribution section 35a provided in the optical element section 33a, and a mount section 34a (corresponding to an example of a first mount section) provided in the optical element section 33a.

The light distribution section 35a has a light guide section 35a1 and a reflection section 35a2.

The light guide section 35a1 presents a rod shape, of which one end is held by the optical element section 33a.

The light guide section 35a1 is formed of the translucent material such as glass or a transparent resin, and has the function of the light guide body.

The other end of the light guide section 35a1 is provided with the reflection section 35a2.

An inclined surface is provided in the reflection section 35a2 on the side with respect to the optical element section 33a.

The light emitted from the light emitting element 22 propagates inside the light guide section 35a1 and is incident on the reflection section 35a2.

If the reflection section 35a2 is formed of a material through which some of the incident light transmits, some of the light incident on the reflection section 35a2 transmits through the reflection section 35a2. Furthermore, some of the light incident on the reflection section 35a2 is reflected by the inclined surface and then is radiated on the side of the optical element section 33a.

If such a light distribution section 35a is provided, it is possible to increase a light distribution angle.

Furthermore, it is possible to control light distribution characteristics by transmittance of the reflection section 35a2, an angle of the inclined surface, or the like.

If the reflection section 35a2 is formed of a material through which the incident light does not transmit, the light incident on the reflection section 35a2 is reflected on the inclined surface and then is radiated on the side of the optical element section 33a.

If such a light distribution section 35a is provided, it is possible to increase the amount of the light radiated on the side of a back surface of the lighting device.

Furthermore, for example, the cover section 30 may include an optical element section 33b, the lens section 35b that is the optical element provided in the optical element section 33*b*, and a mount section 34*b* (corresponding to an example of a second mount section) provided in the optical element section 33*b*.

The lens section 35*b* is formed of a translucent material such as glass or a transparent resin.

The light emitted from the light emitting element 22 is incident on the lens section 35*b* and is collected in a predetermined position.

Furthermore, the configuration is not limited to the example and the lens section 35*b* may spread or diffuse the light incident on the lens section 35*b* in a predetermined direction.

Moreover, the lens section 35*b* has a convex curved surface, but is not limited to the example. For example, the lens section 35*b* may have a concave curved surface or fine concave and convex shape may be provided on the surface in order to diffuse the light.

Furthermore, for example, as described above, the cover section 30 may include the optical element section 33, the concave section 35*c* that is the optical element provided in the optical element section 33, and the mount section 34 provided in the optical element section 33.

Furthermore, for example, the cover section 30 may include an optical element section 33*d*, the light guide section 35*d* that is the optical element provided in the optical element section 33*d*, and a mount section 34*d* provided in the optical element section 33*d*.

The light guide section 35*d* presents a line shape, of which one end is held by the optical element section 33*d*.

The light guide section 35*d* is formed of a translucent material such as glass or a transparent resin, and has the function as the light guide body.

In this case, the light guide section 35*d* may be formed of a translucent material having flexibility.

The light emitted from the light emitting element 22 propagates inside the light guide section 35*d* and some of the light is radiated from the side surface of the light guide section 35*d* toward the outside.

If the light guide section 35*d* is formed of the translucent material having the flexibility, the light guide section 35*d* may be any shape. That is, the portion in which the light is emitted may be any shape. Thus, it is possible to improve the design property.

As described above, the lighting device set 51 according to the embodiment may include at least the following sections.

(1) The body section 10 that is common (2) The first cover section provided on the end surface of the body section 10

(3) The second cover section provided on the end surface of the body section 10

(4) The light emitting module 20 provided between the body section 10 and the first cover section, or between the body section 10 and the second cover section, and having the light emitting element 22

In this case, the first cover section has the first mount section that allows the first cover section to be mounted on a first lamp fitting, and a first optical element that performs optical control to the light emitted from the light emitting element 22.

Furthermore, the second cover section has the second mount section that allows the second cover section to be mounted on a second lamp fitting, and the second optical element that performs the optical control to the light emitted from the light emitting element 22.

Furthermore, the optical element sections 33, 33*a*, 33*b*, and 33*d*, and the mount sections 34, 34*a*, 34*b*, and 34*d* may have the shapes or dimensions suitable for the mounting member and the like on the side of the lamp fitting 100.

That is, the cover section 30 may have the mount sections 34, 34*a*, 34*b*, and 34*d*, and the optical element sections 33, 33*a*, 33*b*, and 33*d* which are different from each other for each of the types of the lamp fitting 100.

For example, a cover section 130*a* (corresponding to an example of the first cover section) may have the mount section 34*a* that allows the cover section 130*a* to be mounted on the first lamp fitting, and an optical element 35*a* that performs the optical control to the light emitted from the light emitting element.

A cover section 130*b* (corresponding to an example of the second cover section) may have the mount section 34*b* that allows the cover section 130*b* to be mounted on the second lamp fitting, and an optical element 35*b* that performs the optical control to the light emitted from the light emitting element 22.

Furthermore, the wiring section 40 may have connectors 42, 42*a*, 42*b*, and 42*d*.

In this case, the forms or the models of the connectors 42, 42*a*, 42*b*, and 42*d* may be different from each other depending on the types of the lamp fitting 100.

Furthermore, connectors 142, 142*a*, 142*b*, and 142*d* may be suitable respectively for the connectors 42, 42*a*, 42*b*, and 42*d*.

In this case, if the type (for example, the form, the model, or the like) of the lamp fitting 100 is determined, the type of the cover section that is used, the type of the light emitting module, the type of the wiring electrically connected to the light emitting module, and the type of the connector are determined.

Thus, the lighting device set 51 may have the body section 10 that is common, the cover section depending on the type of the lamp fitting 100, the light emitting module, the wiring, and the connector so as to correspond to various lamp fittings 100.

Moreover, the configuration of the cover section 30 and the configuration of the wiring section 40 are not limited to the example.

The configuration of the cover section 30 and the configuration of the wiring section 40 may be appropriately changed depending on the optical specification with respect to the lighting device 1, the mounting member on the side of the lamp fitting 100, or the like.

In the lighting device set 51 according to the embodiment, the cover section 30 having a desired optical function may be appropriately selected. Thus, in the lighting device set 51, it is possible to achieve the common body section 10 and to rapidly correspond to various optical specifications with respect to the lighting device.

In addition, it is also possible to exert the same effects as those of the lighting device 1 described above.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions. Moreover, above-mentioned embodiments can be combined mutually and can be carried out.

What is claimed is:

1. A lighting device comprising:
a body section;
a cover section that is provided on an end surface of the body section;
a light emitting module that is provided between the body section and the cover section, and has a light emitting element; and
a positioning section that protrudes from the end surface of the body section, the light emitting module provided on the positioning section,
wherein the cover section includes:
  a first base section that is provided in the end surface of the body section, an inner side surface of the first base section that contacts with an outer side surface of the positioning section;
  an optical element section that protrudes from the end surface of the first base section on an opposite side of the body section in a direction of a center axis of the lighting device;
  a mount section that protrudes from a side surface of the optical element section in a direction orthogonal to the center axis of the lighting device, the mount section that protrudes from the side surface of the optical element section toward an outside; and
  an optical element that is provided in the optical element section and performs optical control to light emitted from the light emitting element,
wherein a distance between a portion of the light emitting module which is the nearest to an end surface of the cover section and the end surface is equal a distance between a portion of the body section which is the nearest to the end surface and the end surface, or is shorter than the distance between the portion of the body section which is the nearest to the end surface and the end surface, and
wherein a distance between an opposite end to the end surface of the cover section and the end surface is longer than the distance between the portion of the light emitting module which is the nearest to the end surface and the end surface.

2. The device according to claim 1,
wherein the optical element has at least one of a light distribution section, a reflector, a lens, and a light guide body.

3. The device according to claim 1, further comprising:
wiring of which one end is electrically connected to the light emitting module; and
a connector that is electrically connected to the other end of the wiring.

4. The device according to claim 1,
wherein the body section includes:
  a second base section;
  a flange section that protrudes from a side surface of one end section of the second base section of the body section in a direction orthogonal to the center axis of the lighting device; and
  a positioning section that protrudes from the end surface on the opposite side of a side of the flange section in which the second base section of the body section is provided in the direction of the center axis of the lighting device.

5. The device according to claim 4,
wherein a concave section is provided in the first base section of the cover section, and
wherein the positioning section is fitted into the concave section.

6. The device according to claim 4,
wherein the light emitting module is provided on the end surface of the positioning section on the opposite side of the side of the flange section.

7. The device according to claim 4,
wherein the cover section further includes a holding claw that is provided near a peripheral edge of the first base section of the cover section, and
wherein the holding claw comes into contact with the flange section and presses the first base section of the cover section against the flange section by an elastic force.

8. The device according to claim 7,
wherein a plurality of holding claws are provided.

9. The lighting device according to claim 7,
wherein the position of the one end section on the side of the body section in the portion in which the cover section comes into contact with the body section is a position of a leading end of the holding claw.

10. The device according to claim 1,
wherein the light emitting module further includes
a substrate in which the light emitting element is provided; and
a sealing section that covers the light emitting element.

11. The device according to claim 1,
wherein the light emitting element is at least one that is selected from a group including a light emitting diode, an organic light emitting diode, and a laser diode.

12. The device according to claim 10,
wherein the sealing section includes a translucent material.

13. The device according to claim 12,
wherein the sealing section includes a phosphor.

14. The device according to claim 10,
wherein the light emitting module further includes a surrounding wall member that is provided on the substrate and surrounds the light emitting element.

15. The device according to claim 14,
wherein the surrounding wall member presents a circular shape and the light emitting element is exposed in a center section thereof.

* * * * *